United States Patent
Hassan et al.

(10) Patent No.: US 9,277,032 B2
(45) Date of Patent: Mar. 1, 2016

(54) ERROR CONTROL CODING FOR NONCONTIGUOUS CHANNEL AGGREGATION

(75) Inventors: Amer A. Hassan, Kirkland, WA (US);
Danny Allen Reed, Redmond, WA (US);
Paul William Garnett, Albany, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

(21) Appl. No.: 13/526,518

(22) Filed: Jun. 19, 2012

(65) Prior Publication Data
US 2013/0336335 A1   Dec. 19, 2013

(51) Int. Cl.
*H04J 3/22*       (2006.01)
*H04L 29/06*      (2006.01)
*H04L 12/707*     (2013.01)

(52) U.S. Cl.
CPC ............... *H04L 69/14* (2013.01); *H04L 45/24* (2013.01); *Y02B 60/33* (2013.01)

(58) Field of Classification Search
CPC ....... H04L 1/00; H04L 69/14; H04L 12/5695; H04L 45/24
USPC .......................................... 375/222; 714/752
See application file for complete search history.

(56) References Cited

U.S. PATENT DOCUMENTS

| | | | |
|---|---|---|---|
| 6,681,365 B1 | 1/2004 | Anand et al. | |
| 7,308,402 B2 | 12/2007 | Zhou et al. | |
| 7,500,167 B2 * | 3/2009 | Widdup | 714/752 |
| 2002/0051462 A1 | 5/2002 | Ertel et al. | |
| 2002/0159513 A1 * | 10/2002 | Williams et al. | 375/222 |
| 2003/0184458 A1 | 10/2003 | Calvignac et al. | |
| 2003/0227397 A1 | 12/2003 | Cideciyan et al. | |
| 2007/0165717 A1 | 7/2007 | Ye | |
| 2010/0128813 A1 * | 5/2010 | Abbasfar et al. | 375/295 |
| 2011/0161771 A1 | 6/2011 | Zheng et al. | |

OTHER PUBLICATIONS

Patel, et al., "Rate Distortion Performance for Joint Source Channel Coding of JPEG Image Over AWGN Channel", In Proceedings of the International Journal of Image Processing (IJIP), vol. 4, Issue 6, Feb. 8, 2011, pp. 610-619.

* cited by examiner

*Primary Examiner* — Mark Rinehart
*Assistant Examiner* — Gbemileke Onamuti
(74) *Attorney, Agent, or Firm* — Steven Wright; Judy Yee; Micky Minhas (57) ABSTRACT

The subject disclosure is generally directed towards a technology by which non-contiguous channels of unequal bandwidth may be aggregated for use by communication devices. A data stream is partitioned (e.g., via puncturing) into partitioned data streams for communication over aggregated non-contiguous channels, one partitioned data stream per channel, in which partitioning is based upon each channel's bandwidth. Secondary puncturing may be used on any partitioned data stream that is to be transmitted over a channel associated with a regulatory constraint, e.g., a regulatory mask. Database querying, which may include providing device filter characteristics, may be used to obtain the set of channels available for use, along with any regulatory mask associated with a channel.

20 Claims, 7 Drawing Sheets

ERROR CONTROL CODING FOR NONCONTIGUOUS CHANNEL AGGREGATION

BACKGROUND

In dynamic spectrum access (DSA) systems, a DSA-enabled communications device typically has an available a set of radio frequency (RF) channels to use for broadband communications. Such a device selects a channel, which device software can subsequently change based upon database lookups and/or sensed interference. In general, DSA-enabled devices look for available channels across a wide range of spectrum in order to provide broadband networking to computing device users.

Conventionally designed DSA systems assume that channels are of equal bandwidth, and that data across the channels are designed (encoded, encrypted, and modulated) independently. These assumptions result in generally inefficient, and potentially highly inefficient, use of spectrum and power.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a plurality of channels is aggregated for use in communication between communication devices, including when at least two channels have unequal bandwidths. A data stream is partitioned into a plurality of partitioned data streams corresponding to the plurality of channels, in which partitioning is based upon bandwidth data of each channel. Partitioning may be accomplished in one implementation by puncturing the data stream based at least in part upon the bandwidth data into a first partitioned data stream comprising bits remaining after the puncturing and a second partitioned data stream comprising bits removed via the puncturing, and so on as needed until a desired number of partitioned data streams is obtained.

In one aspect, database querying may be used to obtain information that identifies the plurality of channels and the bandwidth data associated with the channels. The querying may include providing device filter characteristics.

In one aspect, a partitioned data stream may be punctured to further reduce the partitioned data stream to meet a regulatory constraint associated with a channel over which that partitioned data stream is to be transmitted. The regulatory constraint data, such as a regulatory mask, may be obtained by database querying, and may be dependent on device filter characteristics.

In one aspect, a communications device queries a database, including providing information corresponding to device filter characteristics to the database, and receives a response from the database including available channel information, in which the available channel information is based upon the device characteristics. A partitioning mechanism may partition an error correction coded data stream into partitioned data streams for transmitting over at least two channels of the plurality of available channels. Regulatory constraint data associated with at least one of the plurality of available channels may be met via a puncturing mechanism.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards efficient aggregation of dynamic spectrum access (DSA) channels for broadband communications. In one aspect, channels of variable and/or differing bandwidths can be aggregated, including noncontiguous channels. In one implementation, partitioning (based upon puncturing) divides a data bit stream among multiple channels. Further, the technology described herein provides potential coding gains when inter-channel (joint) signal design is performed. As will be understood, the technology thus generally provides for more efficient use of spectrum and/or power.

It should be understood that any of the examples herein are non-limiting. For example, while television whitespace provides one set of available channels that may be obtained by querying a regulatory database/(regulatory approved database), any frequencies may be used with the technology described herein, including frequencies in unlicensed or licensed bands. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in communications in general.

Figure 1:
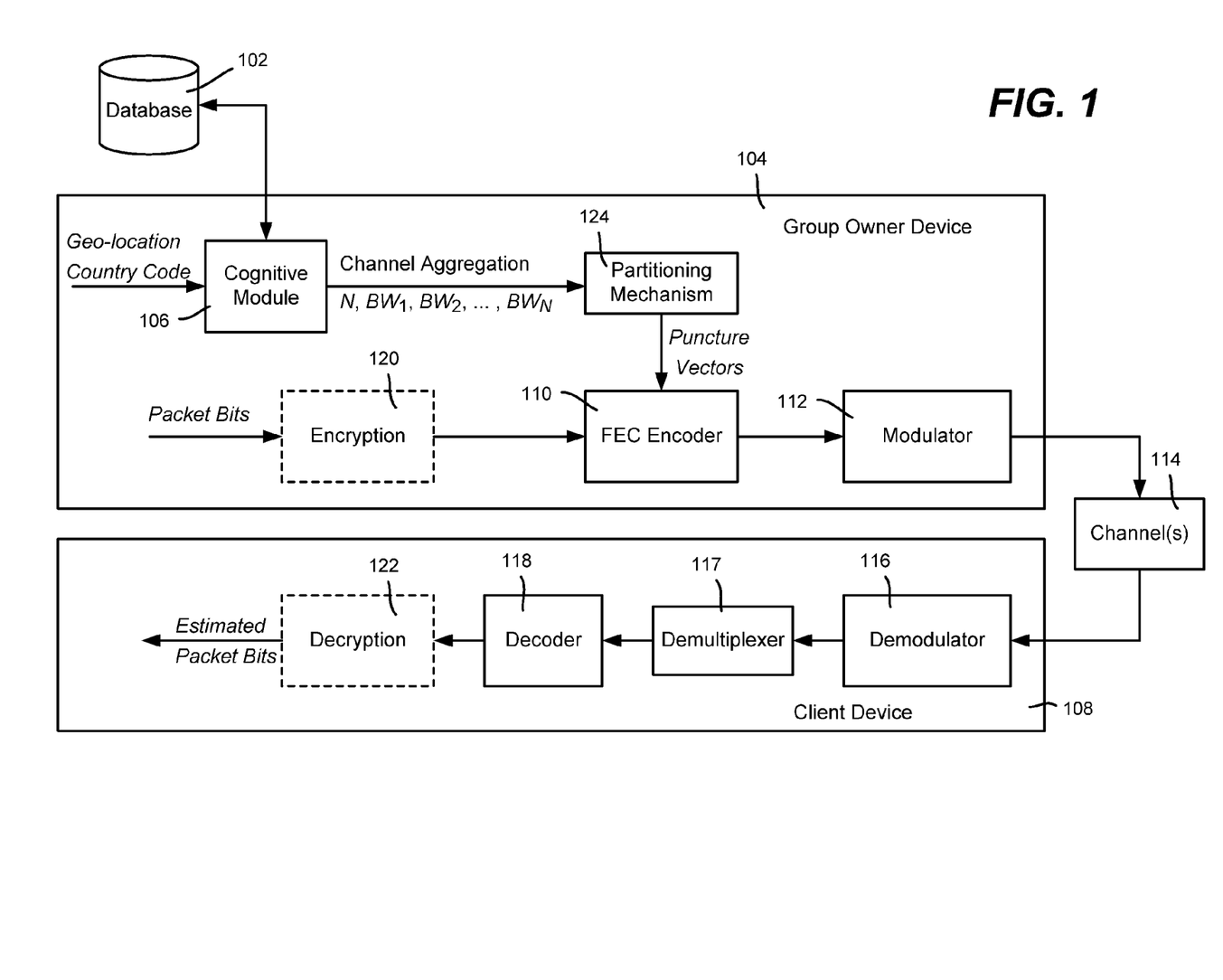
FIG. 1 is a block diagram showing example components of a system configured to transmit and receive data over aggregated channels, including channels of unequal bandwidth.

FIG. 1 shows a block diagram comprising an example digital communications system having multiple channels available for use, in which the available channels may be discontinuous and not necessarily the same bandwidth as one another. As described herein, channels of differing bandwidth includes a set of channels (such as television channels) in the RF spectrum that may be each divided so as to have the same bandwidth, but one or more of which have their respective bandwidth intentionally narrowed, such as by regulation or for another reason (such as detected interference in part of the channel). For example, a channel may have its bandwidth narrowed by a regulatory agency to ensure that any device using that channel cannot inadvertently cause interference on a nearby restricted channel, or on a subchannel within that channel's bandwidth.

In the example of FIG. 1, the available channels are determined by querying a database 102 (e.g., a regulatory-approved database) with a geo-location code of a DSA-enabled (group owner) device 104. For example, while certain frequencies/channels are reserved for broadcast television, not all television channels are used in a given region; the frequencies corresponding to unused broadcast television channels, referred to as television whitespace, may be available for use by DSA systems. Because in this example the frequencies that are available thus vary according to location, a cognitive module 106 of the group owner device 104 queries the regulatory database 102, including providing the group owner device's current location data. Note that instead of or in addition to a regulatory database, for example, other databases including a private database may be used, such as for allowing sub-licensing of a service provider's unused part or parts of licensed channels. Available channels from different databases may be combined into a larger set, including channels having different bandwidths for use as described herein.

The group owner device 104 receives a response that indicates which channels are available for use at that location (for an allowed duration, e.g., for the next twenty-four hours) for communicating with a client device 108. In the example of FIG. 1, the returned information may include not only the number of channels N and a list of which channels are available, e.g., each identified by a center frequency, but also the amount of bandwidth for each channel. In FIG. 1, the number of channels N and the corresponding bandwidths $BW_1$, $BW_2$, ..., $BW_N$ are included in the output of the cognitive module 106; (note that typically at least some of the available channels are non-contiguous, and contiguous channels may be combined into a single channel having summed bandwidths).

In FIG. 1, the group owner device 104 is shown as having components including an FEC encoder 110 and a modulator 112 for transmitting encoded data over one or more channels 114 to the client device 108, which is shown as having components including a demodulator 116, a demultiplexer 117 and a decoder 118 for receiving, combining and decoding the data. It is understood that the group owner device 104 similarly has components for receiving/decoding data transmitted in the opposite direction by similar transmitting/encoding components of the client device 108. Encryption and decryption modules 120 and 122, respectively, are also shown in FIG. 1; these are represented in FIG. 1 as dashed blocks to indicate that any encryption may be done before or after encoding, as may corresponding decryption with respect to decoding.

Also shown in FIG. 1 is a partitioning mechanism 124 that partitions data bits into sets for transmitting each set over one channel of those in use, e.g., two sets for two channels, three sets for three channels, and so on. Partitioning is dependent on the bandwidth of each channel available for use, using puncture vector selection based upon the available channels to be used and their bandwidths. Note that in one implementation the complexity of the decoder does not increase; that is, an identical FEC decoder may be used to decode all bits of variable widths.

Figure 2:
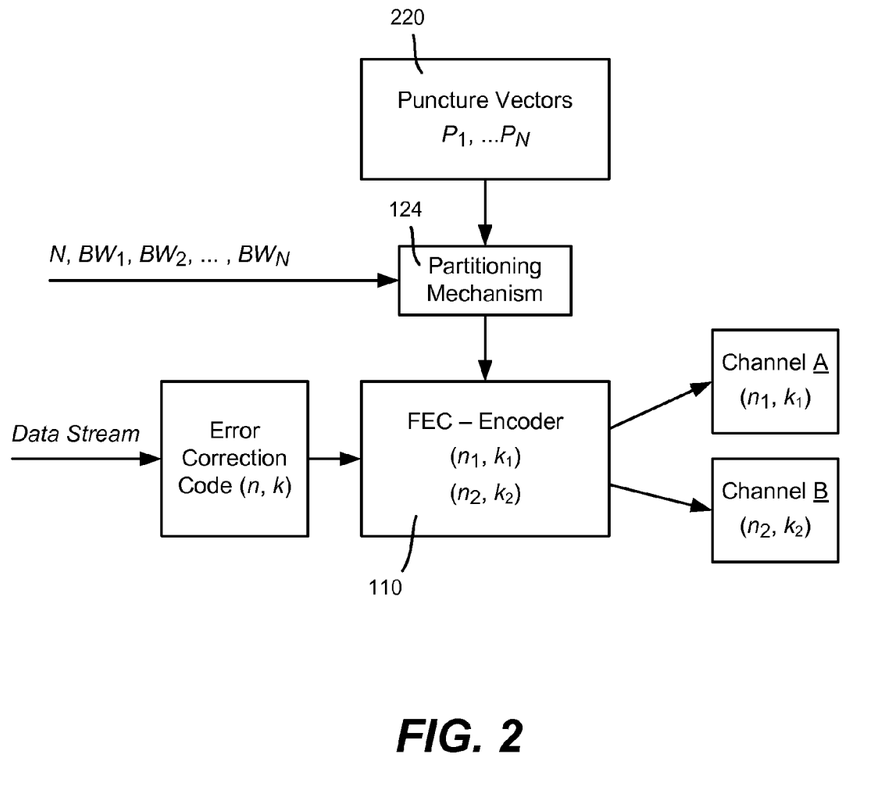
FIG. 2 is a block diagram demonstrating example partitioning of a data stream into partitioned data streams for transmission over aggregated channels.

As represented in more detail in the two-channel example of FIG. 2, the partitioning mechanism 124 selects one or more puncture vectors from a set 220 (e.g., a library) for puncturing the incoming stream as described herein. Instead of discarding punctured bits, those bits are further used. For example, in a two channel aggregation, the bit stream is punctured so that a first channel A transmits the stream after puncturing, and a second channel B transmits the punctured bits.

In this implementation, the bits at the input of the error correction encoder are thus partitioned into multiple streams by puncturing, while not discarding punctured bits. In one implementation, partitioning characteristics include that the number of multiple streams is equal to the number of non-contiguous channels available to the device; (note that any contiguous channels may be treated as one channel of larger bandwidth). This may be represented as a partition matrix $P=(P_1, P_2, \ldots, P_N)$, where N is the number of streams and $P_i$ is a vector of length n (the codeword length). Note however that not all channels need be selected for use; for example, a particular device may not be capable of using certain frequencies even if available, some channels may be detected as having noise and not worthwhile using, and so forth, and thus N may be reduced to some lesser number N', for example. The error control coding rate of channel i is $r_i$, which depends on the i-th channel's bandwidth. For example, television whitespace in the United States has a channel bandwidth close to 6 MHz, which as described herein may be aggregated (combined) with a channel in the 900 MHz ISM band, having a bandwidth (for instance) of 2 MHz.

In FIG. 2, where the input to the FEC encoder 110 comprises a sequence of binary bits, the encoder 110 is characterized by code C(n, k) determining the overhead/parity (n–k) that the "joint" channels can accommodate. The error correction coded data stream, represented by code C(n, k), is partitioned according to the puncture vectors $P_i$, which results in code $C_i(n_i, k_i)$. There are N such codes. Code i is then transmitted over channel i, where i ranges from one to the number of channels to be aggregated, which in the example of FIG. 2 is two. Note that the error correction coded data stream includes any data stream including one that may be encrypted before or after encoding/partitioning. Modulation of code $C_i$ may be accomplished by nulling out the subchannels that are not allowed over channel i, such as due to a regulatory constraints (e.g., corresponding to a regulatory mask) as described below; in one implementation an Orthogonal Frequency Division Multiple Access (OFDMA) signal is transmitted by nulling out subchannels that are not available in a frequency band.

Figure 3:
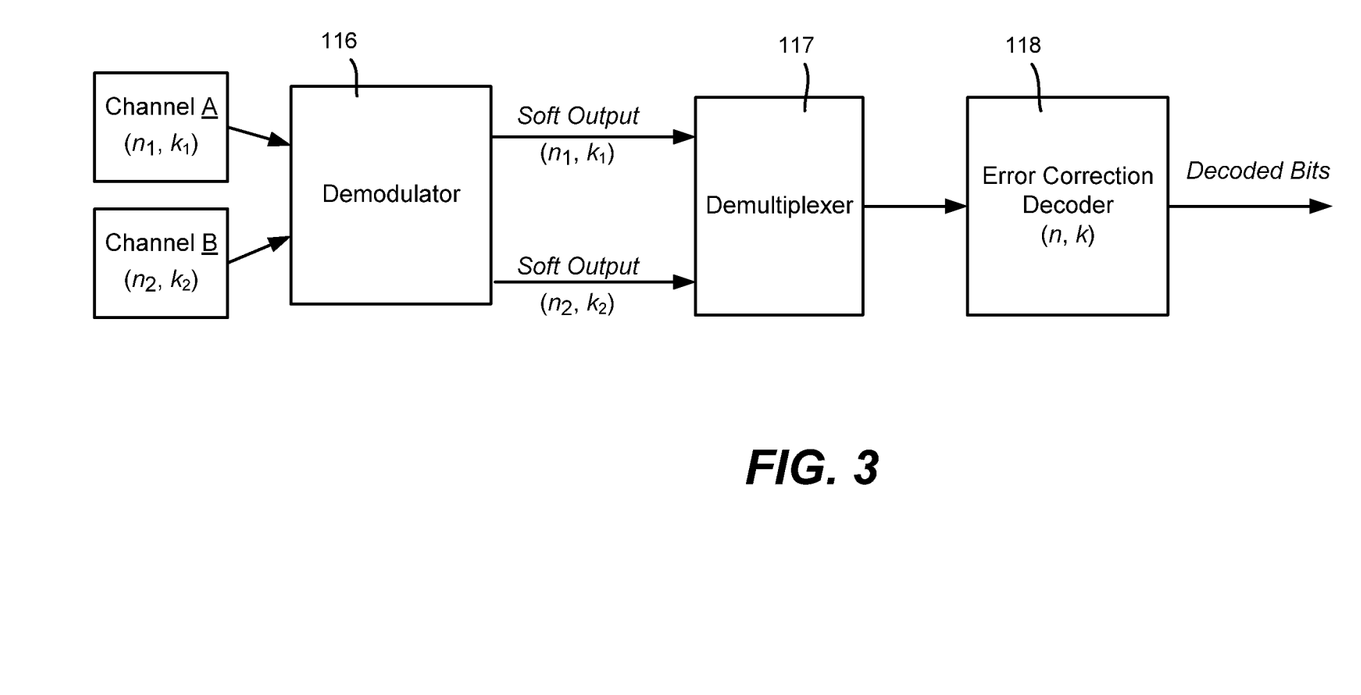
FIG. 3 is a block diagram demonstrating example handing of data received over aggregated channels.

Corresponding receiver components are shown in FIG. 3. The soft data from the demodulator 116 are demultiplexed by a demultiplexer 330 to form a single stream that is then decoded. In one implementation, the demultiplexer 117 incorporates channel measurement to decide reliability of the channels. If one of the aggregated channels is detected to have severe interference, and the other channel does not, the demultiplexer 117 signals the decoder to use a punctured decoder.

Note that the puncture vectors may be pre-computed ahead of time and stored on the device, e.g., a set/library of puncture vectors determined experimentally or otherwise so as to have a good minimum Hamming distance (given the various bandwidths). There may be a puncture vector for each bandwidth among a set of bandwidths, e.g., various puncture vectors at half-megahertz increments, (and for regulatory constrained secondary puncturing as described below). Note that it is feasible however to generate such a puncture vector on demand.

The bandwidth available for a channel may be subject to a regulatory mask that narrows the channel's bandwidth. Making a channel available subject to a bandwidth limitation tends to increase the total number of channels available, because part of a channel may be available rather than having the entire channel deemed unavailable.

Note that in a scenario referred to as an "open loop" scenario, used in some countries, the available channels/subchannels are decided the same way for any given device based upon the non-restricted channels for a given location. However this is not necessarily true in other countries, and in a "closed loop" scenario, a device may "negotiate" available channels. For example, when querying a database to obtain the set of available channels, a device may provide its filter characteristics, such as represented by a value or the like, and receive a set of channels based upon those characteristics, e.g., the higher the filter quality, typically the more channels returned as available. A device or type of device may be pre-registered with a database or other service, so that the device need only provide an identifier for the database to look up the device's filter characteristics, that is, an identifier of the device or type of device provides the database with the data corresponding to the device's filter characteristics. A group owner device may provide the filter characteristics for each client device, for example, or provide the data for the lowest quality filter, to ensure that the client device does not do transmit over a channel disallowed to the client, even if more allowed to the group owner device, or vice-versa. Alternatively, a client device can provide such information (e.g., obtained via a client query) to the group owner device, which the group owner device may then use in determining allowable communication with that client device.

In another scenario, referred to herein as "closed loop with enhancements," based upon a device's filter characteristics, the device may receive a set of one or more full bandwidth channels along with a set of one or more narrower channels, e.g., narrowed by a regulatory mask. That is, based upon the quality of the filter as known from filter characteristics for a given device (or multiple devices), full channels and narrowed channels with regulatory masks may be determined at the database. In general, devices with a higher quality filter receive more bandwidth (more subchannels) for any channel subject to a regulatory mask than devices with a poorer quality filter, which may receive less bandwidth (fewer subchannels) for a channel, including not being allowed to use any part of a channel.

Figure 4:
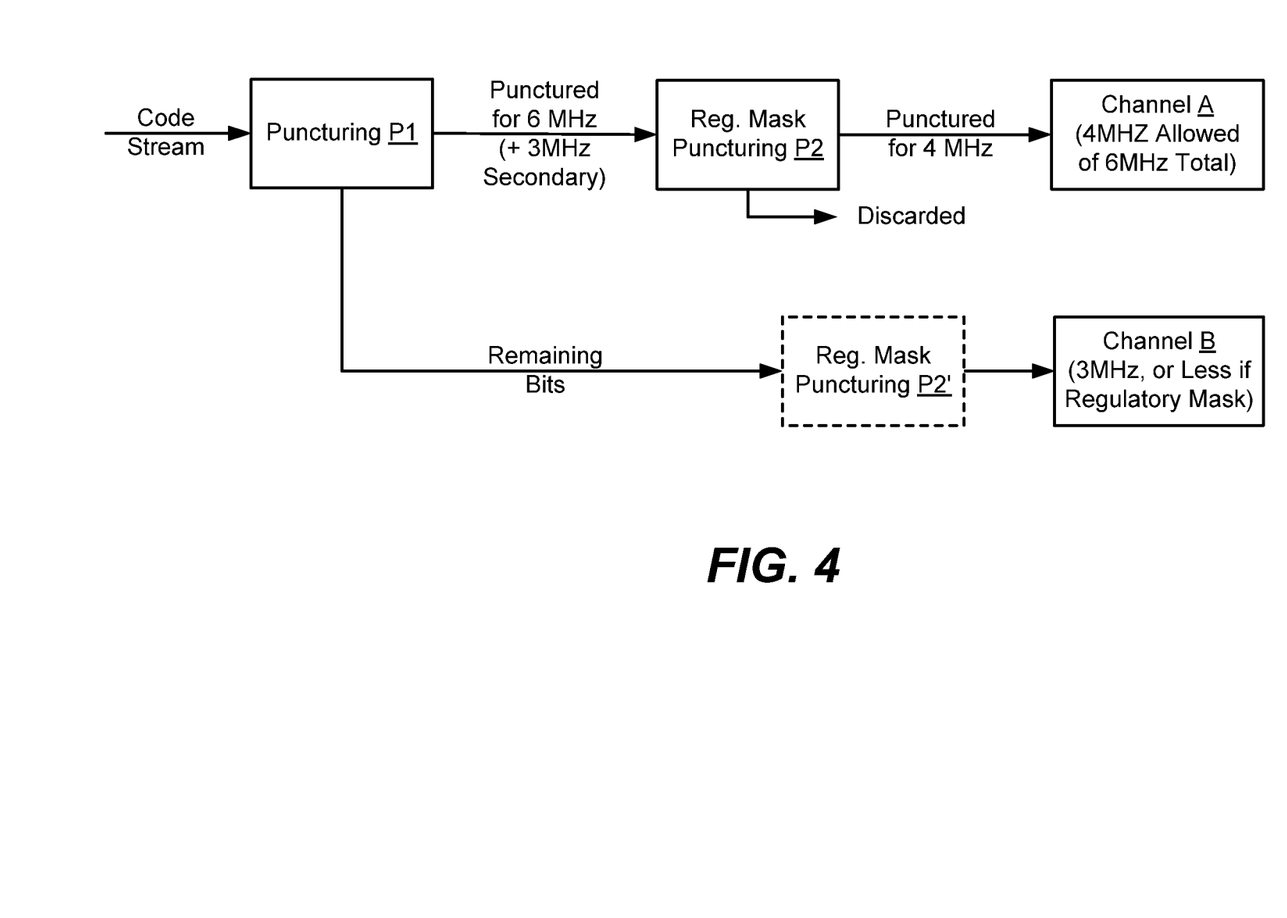
FIG. 4 is a block diagram showing an example of secondary puncturing of a partitioned data stream to meet regulatory constraints associated with a channel.

To meet a regulatory mask's bandwidth requirements, secondary puncturing may be performed. Partitioning via initial puncturing first assumes the full bandwidth is available, with puncturing performed as if so, as generally represented by block P1 in FIG. 4. For example, if a six megahertz channel A is available and a three megahertz channel B is available, a puncture vector may be selected to correspond to a ⅓ rate and a ⅔ rate, whereby the bits removed (punctured out) from this initial puncturing are used for channel B. Then, to fit a regulatory mask that for example narrows channel A to four megahertz, puncturing of the bits that remain after the first puncturing is performed in a secondary puncturing operation (block P2 representing a secondary puncturing mechanism/ operation) to achieve the four megahertz regulatory mask requirement (within the total six megahertz bandwidth of channel A). A similar secondary puncturing for the bits of channel B may be performed if needed to narrow that channel as well, as represented by the dashed block P2'; note that the dashed block indicates that such puncturing only occurs if a regulatory mask exists for channel B.

Figure 5:
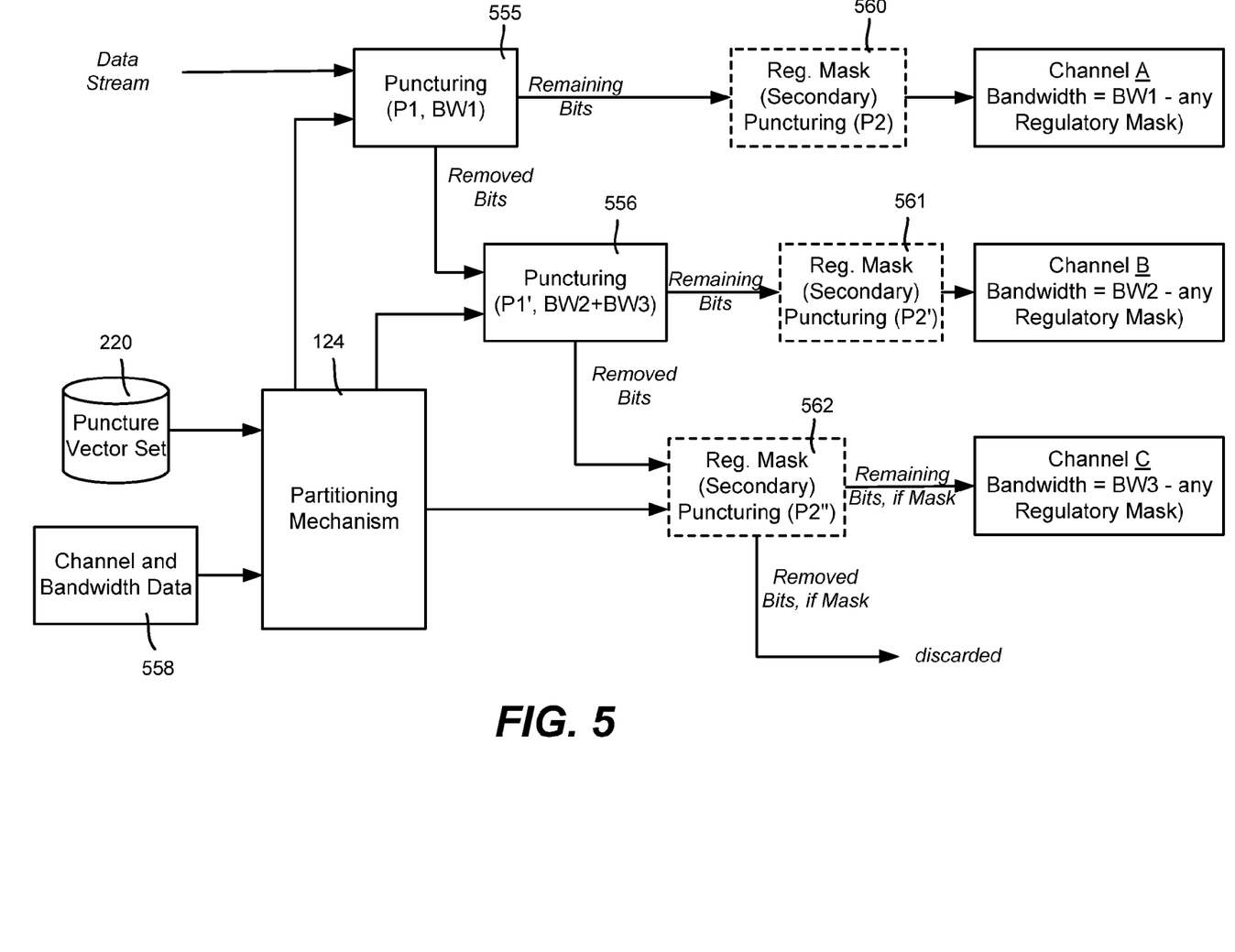
FIG. 5 is a block diagram showing example partitioning over three aggregated channels, including secondary puncturing of a partitioned data stream if needed to meet regulatory constraints.

FIG. 5 shows an example of puncturing (blocks 555 and 556) for more than two channels, which in this example uses three channels A, B and C, corresponding to bandwidths BW1, BW2 and BW3, respectively. Regulatory masks may or may not exist for any channel, as indicated by the dashed blocks 560-562.

The partitioning mechanism 124 obtains the channel and bandwidth data 558 and uses it to select puncturing vectors from the puncture vector (library) set 220. The coded stream is punctured in a first puncturing operation 555 corresponding to a puncture vector based upon the bandwidths, including the full bandwidth BW1 for channel A. If a regulatory mask exists for channel A, secondary puncturing P2 (block 560) is performed to match the specified bandwidth.

The punctured bits resulting from the first operation are then processed in another level initial partitioning (puncturing P1') operation 556 for channel B, in which puncturing depends on the remaining (full) bandwidths BW2 and BW3. Note that basically the partitioning operation is the same (likely with a different puncturing vector) except that the partitioned bits are not from the initial coded stream but are instead those removed from the previous partitioning (P1 puncturing) operation. If a regulatory mask exists for channel B, secondary puncturing P2' (block 561) is performed to match the specified bandwidth for channel B.

Because channel C is the last channel, the bits need not be partitioned further. Only if there is a regulatory mask associated with channel C is "secondary" puncturing P2 performed on the remaining bits, as represented via dashed block 562, this time with removed bits discarded.

Figure 6:
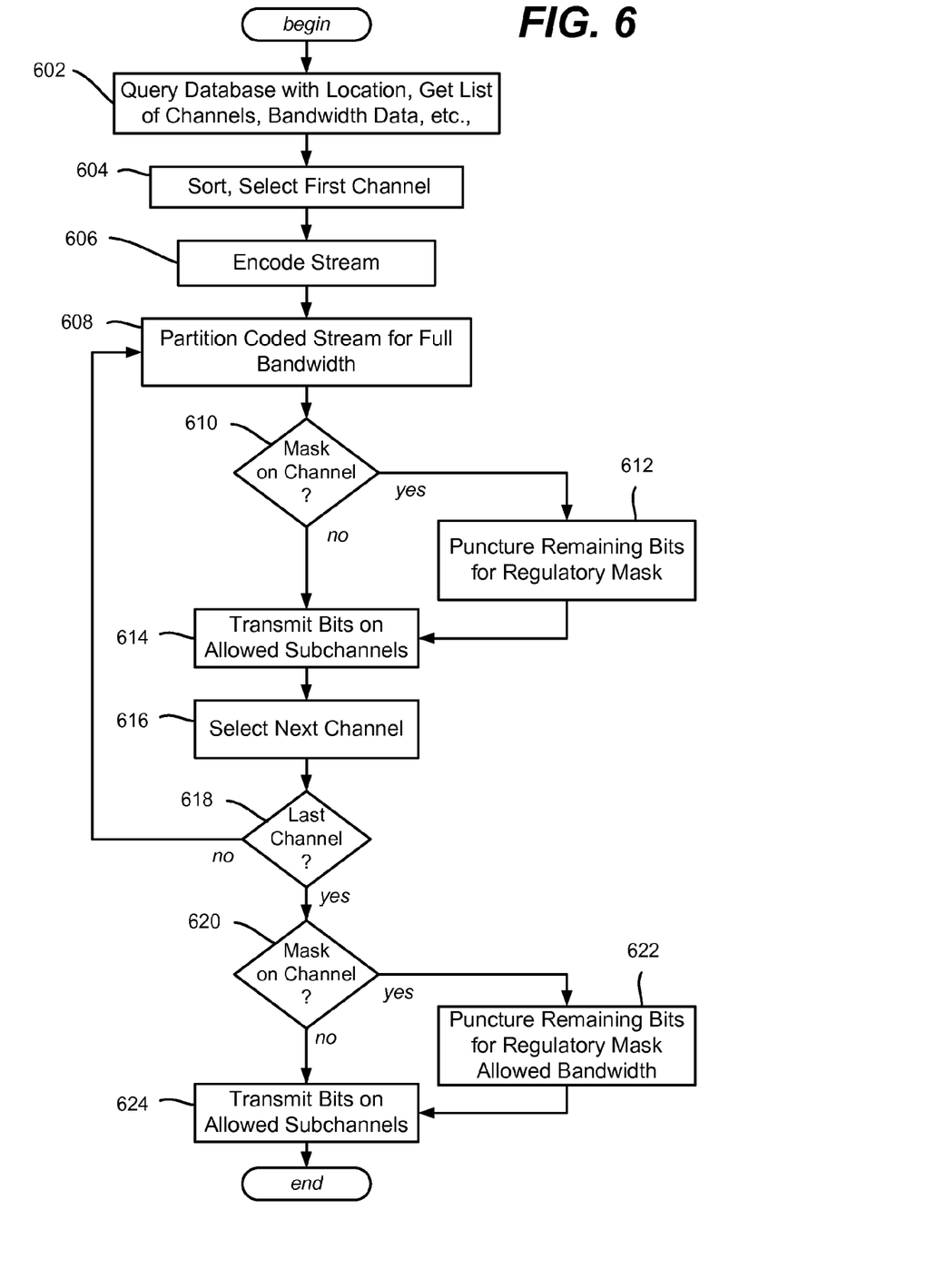
FIG. 6 is a flow diagram representing example steps that may be taken to aggregate channels by partitioning data streams, and if needed secondarily puncture partitioned data streams if needed to meet regulatory constraints.

FIG. 6 is a simplified flow diagram representing example steps in processing data stream for multiple, non-contiguous channels of possibly varying bandwidths. Step 602 represents querying one or more databases with location data, and receiving the list of available channels and bandwidth information for each. The query may include device characteristics, such as for the group owner device, client device, or whichever device has the lowest quality filter characteristics. Regulatory mask data may also be returned, along with possibly other information (e.g., any interference data per channel).

Step 604 represents sorting the channels for use, e.g., from highest to lowest bandwidth, which may include any regulatory mask narrowing, and selecting the first channel. Step 606 represents encoding the incoming with error correction coding. Note that FIG. 6 assumes that the coded stream is to be partitioned among multiple channels.

Step 608 represents partitioning the coded stream for the channels via a puncture vector selected based upon the bandwidth data, assuming full bandwidth for the selected channel, that is, with no regulatory mask. Steps 610 and 612 further puncture to meet the narrowed bandwidth if such a mask exists for the selected channel.

Step 614 represents transmitting the bits on the allowed subchannels, which may be all subchannels or those allowed by the mask. Note that queuing and the like may first take place, and transmission may occur independent of the partitioning steps.

Step 616 selects the next channel. If not the last channel (at step 618), then the process is repeated from step 608, starting with the removed data stream (the bits that were partitioned/ punctured out at the previous step 608), using puncture vectors selected based upon the remaining channels' bandwidths.

When the last channel is reached, no partitioning of the remaining bits is needed, whereby step 618 branches to step 620. As there still may be a need to puncture the bits for any regulatory mask for this last channel, step 620 evaluates whether such a mask exists; if so, puncturing is performed via step 622. Step 624 represents transmitting (or at least queuing for transmission) the bits for the last channel.

As can be seen, DSA systems are provided with efficient aggregation of noncontiguous channels. The system allows for channels of variable bandwidths to be aggregated, including taking into consideration potential coding gains when joint (inter-channel) signal design is performed.

Example Operating Environment

Figure 7:
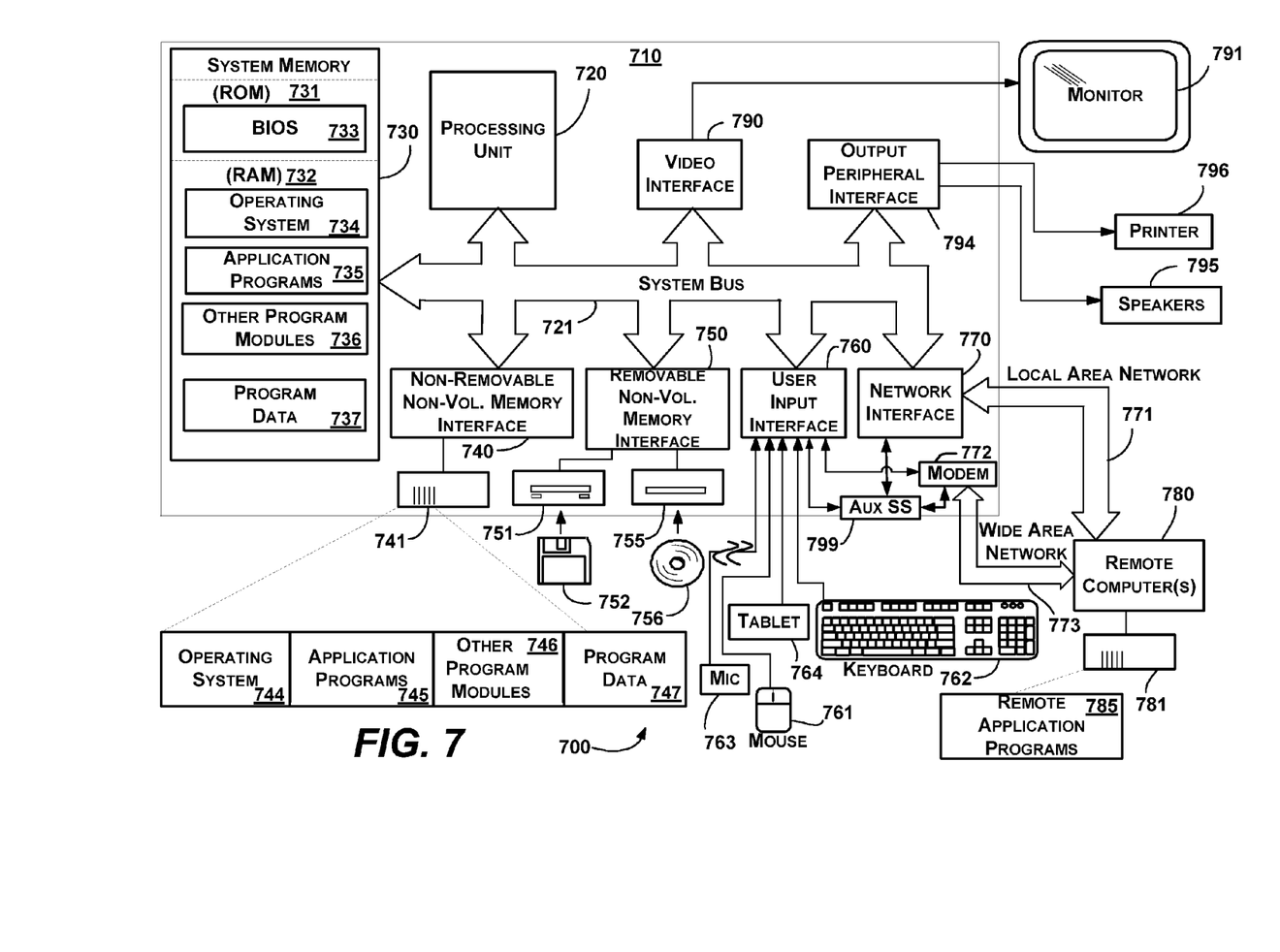
FIG. 7 is a block diagram representing an example computing environment into which aspects of the subject matter described herein may be incorporated.

FIG. 7 illustrates an example of a suitable computing and networking environment 700 into which the examples and implementations of any of FIGS. 1-6 may be implemented, for example. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the example operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an example system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are examples and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor comprising:
   aggregating a plurality of channels for use in communication between communication devices, the plurality of channels including at least two channels of unequal bandwidths; and
   partitioning a data stream into a plurality of partitioned data streams corresponding to the plurality of channels, the partitioning being based upon bandwidth data corresponding to the plurality of channels, the partitioning further comprising:
      puncturing the data stream with:
         a first puncture vector into a first partitioned data stream corresponding to data remaining after the puncturing, the first puncture vector being selected based upon at least part of the bandwidth data; and
         a second partitioned data stream corresponding to data removed from the data stream by the puncturing; and
      puncturing the second partitioned data stream with:
         a second puncture vector into a third partitioned data stream corresponding to data remaining after the puncturing with the second puncture vector; and
         a fourth partitioned data stream corresponding to data removed from the second partitioned data stream by the puncturing with the second puncture vector.

2. The method of claim 1 further comprising:
   from at least one of the communication devices, querying at least one database to obtain information that identifies the plurality of channels and the corresponding bandwidth data associated with the plurality of channels.

3. The method of claim 1 further comprising:
   querying, by at least one communication device, at least one database to obtain information that identifies the plurality of channels and the corresponding bandwidth data associated with the plurality of channels, the querying comprising providing information corresponding to device filter characteristics of the at least one communication device to the database.

4. The method of claim 1 further comprising:
   pre-computing a set of puncture vectors from which the first puncture vector and the second puncture vector are chosen.

5. The method of claim 1, wherein puncturing the data stream with the first puncture comprises secondarily puncturing the first partitioned data stream into a reduced partitioned data stream based upon a regulatory constraint.

6. The method of claim 1 further comprising:
   querying at least one database to obtain information that identifies the plurality of channels, the corresponding bandwidth data associated with the plurality of channels, and regulatory constraint data associated with at least one channel of the plurality of channels.

7. The method of claim 1 further comprising:
   querying at least one database to obtain regulatory constraint data associated with at least one channel of the plurality of channels; and
   nulling out at least one subchannel based on the regulatory constraint data.

8. A system comprising:
a communications device configured to:
query a database, including providing information corresponding to device filter characteristics to the database; and
receive a response from the database, the response including:
available channel information corresponding to at least two available channels, in which the available channel information is based upon the device filter characteristics; and
regulatory constraint data associated with at least one of the at least two available channels; and
a partitioning mechanism configured to:
partition an error correction coded data stream into at least two partitioned data streams via puncture vector selection for transmitting over the at least two available channels, one of the at least two partitioned data streams being transmitted per channel of the at least two available channels; and
secondarily puncture any of the at least two partitioned data streams into a punctured partitioned data stream before transmitting over a corresponding one of the at least two available channels associated with the regulatory constraint data to comply with the regulatory constraint data for that channel.

9. The system of claim 8, wherein the device filter characteristics comprise one or more of the following: data for a group owner device and a client device, and data corresponding to a lowest quality filter between a plurality of devices.

10. The system of claim 8, wherein the partitioning mechanism is further configured to select one or more puncture vectors from a set of puncture vectors and puncture the error correction coded data stream to partition the error correction coded data stream into the at least two partitioned data streams.

11. The system of claim 8, wherein the regulatory constraint data comprises a bandwidth constraint.

12. The system of claim 8, wherein the communications device is further configured to transmit the punctured partitioned data stream over the corresponding one of the at least two available channels associated with the regulatory constraint data by nulling out one or more subchannels that are not allowed over the corresponding one of the at least two available channels based upon the regulatory constraint data.

13. The system of claim 8, wherein querying the database comprises querying the database to obtain bandwidth data associated with the at least two available channels.

14. One or more computer-readable storage devices having computer-executable instructions, which on execution by a computer cause the computer to perform operations, comprising:
querying a database, including providing location data to the database, to determine available channels for device communication at a location corresponding to the location data;
receiving a response from the database, the response identifying a plurality of available channels and bandwidth data associated with the plurality of available channels, the plurality of available channels including a first channel having a different bandwidth relative to a second channel; and
partitioning a data stream with a first puncture vector into:
a first partitioned data stream for the first channel; and
a second partitioned data stream for the second channel, the partitioning being based on the bandwidth data, and the partitioning further including puncturing the second partitioned data stream with a second puncture vector into:
a third partitioned data stream corresponding to data remaining after the puncturing; and
a fourth partitioned data stream corresponding to data removed from the second partitioned data stream by the puncturing.

15. The one or more computer-readable storage devices of claim 14 wherein partitioning the data stream further comprises:
puncturing the data stream into the first partitioned data stream, the first partitioned data stream comprising data remaining after the puncturing, and the second partitioned data stream comprising data removed from the data stream by the puncturing.

16. The one or more computer-readable storage devices of claim 14 having further computer-executable instructions comprising:
providing device filter characteristics that are useable in determining the available channels at the location.

17. The one or more computer-readable storage devices of claim 16, wherein the device filter characteristics comprise one or more of the following: data for a group owner device and a client device, and data corresponding to a lowest quality filter between a plurality of devices.

18. The one or more computer-readable storage devices of claim 14 having further computer-executable instructions comprising:
receiving regulatory constraint data associated with at least one of the first and second channels, and secondarily puncturing any of the first and second partitioned data streams corresponding to the at least one of the first and second channels associated with the regulatory constraint data to meet the associated regulatory constraint data associated with that channel.

19. The one or more computer-readable storage devices of claim 14 having further computer-executable instructions comprising:
pre-computing a set of puncture vectors from which the first puncture vector and the second puncture vector are chosen.

20. The one or more computer-readable storage devices of claim 14 having further computer-executable instructions comprising:
transmitting one or more of the third and fourth partitioned data streams over one or more of the first and second channels by nulling out one or more subchannels not allowed over the respective first and second channels.

* * * * *